US007785399B2

(12) United States Patent
Huang et al.

(10) Patent No.: US 7,785,399 B2
(45) Date of Patent: Aug. 31, 2010

(54) HEAT INTEGRATION FOR HOT SOLVENT STRIPPING LOOP IN AN ACID GAS REMOVAL PROCESS

(75) Inventors: Richard Huang, Vernon Hills, IL (US); Lamar A. Davis, West Dundee, IL (US); William J. Lechnick, Glen Ellyn, IL (US); Xin Zhu, Long Grove, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/354,949

(22) Filed: Jan. 16, 2009

(65) Prior Publication Data

US 2010/0132554 A1    Jun. 3, 2010

(51) Int. Cl.
*B01D 53/02* (2006.01)

(52) U.S. Cl. .............................. 95/114; 95/186; 95/187; 95/191; 95/194; 95/227; 423/226; 423/228; 423/229

(58) Field of Classification Search ................... 95/186, 95/187, 191, 194, 227; 423/226, 228, 229
See application file for complete search history.

(56) References Cited

U.S. PATENT DOCUMENTS

| | | | | |
|---|---|---|---|---|
| 2,519,344 | A | * | 8/1950 | Berg ............................ 95/112 |
| 2,886,405 | A | * | 5/1959 | Field et al. .................. 423/223 |
| 2,967,094 | A | * | 1/1961 | Mitchell ..................... 422/170 |
| 3,829,521 | A | * | 8/1974 | Green ......................... 95/161 |
| 4,048,054 | A | | 9/1977 | Green et al. |
| 4,152,217 | A | * | 5/1979 | Eisenberg et al. .............. 203/2 |
| 4,241,032 | A | * | 12/1980 | Werner et al. ............... 423/226 |
| 4,333,744 | A | * | 6/1982 | Fuderer ......................... 95/93 |
| 4,449,994 | A | * | 5/1984 | Hegarty et al. ................ 62/622 |
| 4,552,572 | A | * | 11/1985 | Galstaun ...................... 95/161 |
| 4,624,838 | A | | 11/1986 | Pan et al. |
| 4,692,318 | A | * | 9/1987 | Tolpin et al. ............. 423/239.1 |
| 4,741,884 | A | * | 5/1988 | Carter et al. ................. 422/171 |

(Continued)

OTHER PUBLICATIONS

Denton, R.D. et al., "Integrated Low Temperature Processing of Sour Natural Gas," 64th Gas Process. Assoc. Annu. Conv. Proc., Houston 1985, pp. 92-96 (abstract only).

(Continued)

*Primary Examiner*—Robert J Hill, Jr.
*Assistant Examiner*—Christopher P Jones
(74) *Attorney, Agent, or Firm*—Mark Goldberg

(57) ABSTRACT

Systems and processes utilize one or more methods of providing overhead waste process heat to increase the feed temperature of the hot solvent stripping regeneration loop in an acid gas removal process. A heated rich solvent stream can be the primary feed for the hot solvent stripping regeneration loop, and one or more slip streams can be heated and then combined with the heated rich solvent stream to form a combined rich solvent stream prior to further processing in downstream units to remove acid gas from the solvent. A first slip stream can be heated in a stripper gas heat exchanger by heat exchange with a stripped gas stream. A second slip stream can be heated in a regenerator exchanger by heat exchange with an acid gas stream. A third slip stream can be heated in a recycle gas exchanger by heat exchange with a compressed recycle gas stream.

20 Claims, 1 Drawing Sheet

U.S. PATENT DOCUMENTS

| | | | | |
|---|---|---|---|---|
| 4,743,356 | A | * | 5/1988 | Soderberg et al. ............ 208/101 |
| 4,798,910 | A | * | 1/1989 | Herrin ........................ 564/497 |
| 4,830,733 | A | * | 5/1989 | Nagji et al. ............. 208/208 R |
| 4,830,734 | A | * | 5/1989 | Nagji et al. ............. 208/208 R |
| 4,840,777 | A | * | 6/1989 | Faucher ...................... 423/229 |
| 4,971,605 | A | * | 11/1990 | Tarman ......................... 95/96 |
| 4,971,718 | A | * | 11/1990 | McCullough et al. ....... 252/189 |
| 5,019,361 | A | * | 5/1991 | Hakka ..................... 423/242.7 |
| 5,085,839 | A | * | 2/1992 | Scott et al. .................. 423/210 |
| 5,462,583 | A | * | 10/1995 | Wood et al. ................... 95/192 |
| 6,080,320 | A | * | 6/2000 | von Phul .................... 210/703 |
| 6,165,433 | A | * | 12/2000 | Chakravarti et al. .......... 423/229 |
| 6,533,925 | B1 | | 3/2003 | Wallace et al. |
| 6,712,880 | B2 | * | 3/2004 | Foglietta et al. ............... 95/184 |
| 6,793,712 | B2 | | 9/2004 | Qualls |
| 7,056,482 | B2 | | 6/2006 | Hakka et al. |
| 7,377,967 | B2 | * | 5/2008 | Reddy et al. .................. 96/242 |
| 7,424,808 | B2 | | 9/2008 | Mak |
| 7,645,433 | B2 | * | 1/2010 | Rhodes et al. ............. 423/228 |
| 7,695,702 | B2 | * | 4/2010 | Rhodes et al. ............. 423/228 |
| 2002/0004533 | A1 | | 1/2002 | Wallace et al. |
| 2002/0023538 | A1 | * | 2/2002 | Agarwal et al. ................ 95/108 |
| 2004/0253159 | A1 | * | 12/2004 | Hakka et al. ................. 423/228 |
| 2006/0010870 | A1 | * | 1/2006 | Pelletier ..................... 60/651 |
| 2006/0032377 | A1 | * | 2/2006 | Reddy et al. .................. 96/234 |
| 2006/0248890 | A1 | * | 11/2006 | Iijima et al. ................... 60/645 |
| 2007/0193303 | A1 | | 8/2007 | Hawrysz et al. |
| 2007/0286784 | A1 | * | 12/2007 | Rhodes et al. ............. 423/228 |
| 2008/0190026 | A1 | | 8/2008 | De Jong et al. |

OTHER PUBLICATIONS

Flynn, A.J. et al., "Shell's Recent Improvement in Gas Treating and Claus Tail Gas Cleanup," 60th Gas Process. Assoc. Annu. Conv. Prepr., San Antionio 1981, p. 11 (abstract only).

Sivasubramanian, M.S. et al., "Simulation of Fully-Integrated Amine Units for Acid Gas Removal," American Institute of Chemical Engineers, National Meeting, 1985, p. 29 (abstract only).

Price, B.C. et al., "SPE 1057/Sour Gas Processing for Gas Sales and LNG Production," SPE (Soc. Pet. Eng.)—Chinese Pet. Soc. Pet. Eng. Soc. Int. Pet. Eng. Meet. Proc., Beijing, China 1988, vol. 1, pp. 145-155 (abstract only).

* cited by examiner

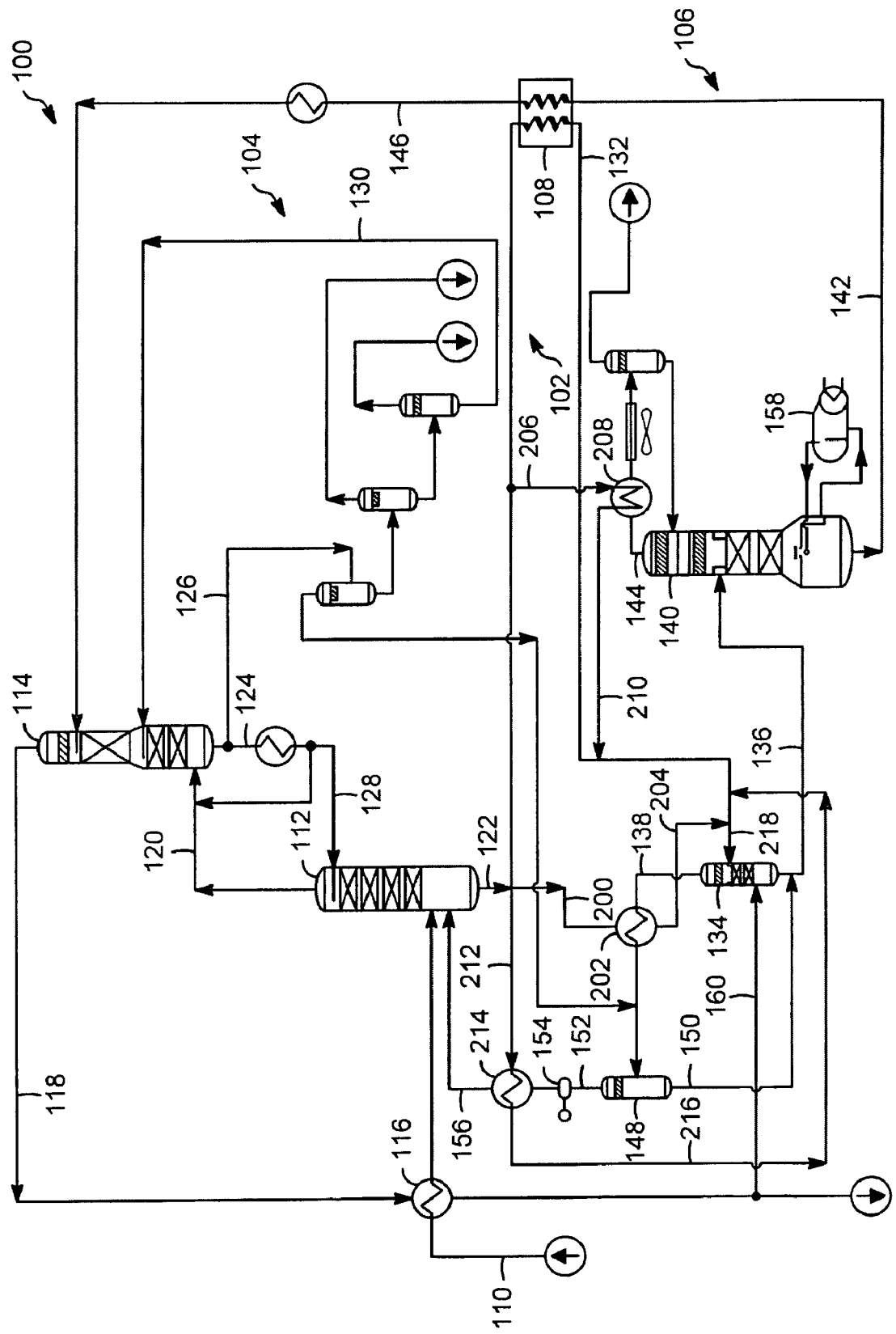

HEAT INTEGRATION FOR HOT SOLVENT STRIPPING LOOP IN AN ACID GAS REMOVAL PROCESS

FIELD OF THE INVENTION

Systems and processes disclosed herein relate generally to acid gas removal, and more particularly to the utilization of overhead waste process heat to increase the feed temperature of the hot solvent regeneration loop in an acid gas removal process.

DESCRIPTION OF RELATED ART

Acid gas removal processes are used widely in gas processing industries to separate acid gases from feed gases of natural gas or synthetic gas. Synthetic gas streams can be, for example, synthesis gas produced by gasification of coal, coke, or heavy hydrocarbon oils. By separating acid gases, the feed gas is made more suitable for combustion and/or further processing. Some acid gas removal processes can utilize a physical solvent, such as, for example, a dimethyl ether of polyethylene glycol, which is commercially available under the trade name Selexol®, available from The Dow Chemical Company. The Selexol® process, licensed by UOP, is one known process that utilizes the Selexol® physical solvent. Such processes can be ideally suited for the selective removal of hydrogen sulfide ($H_2S$) and other sulfur compounds, or for the bulk removal of carbon dioxide (CO2). Such processes can also be used for removal of carbonyl sulfide (COS), mercaptans, ammonia, hydrogen cyanide (HCN) and metal carbonyls.

SUMMARY OF THE INVENTION

Systems and processes disclosed herein relate to the utilization of overhead waste process heat to increase the feed temperature of the hot solvent regeneration loop in an acid gas removal process.

In one aspect, an acid gas removal process is provided that includes providing a feed gas including acid gas to at least one absorber, where the at least one absorber includes an absorbent material that absorbs acid gas. Acid gas can be removed from the feed gas by absorption to produce a first rich solvent stream including solvent and acid gas. At least one slip stream can be separated from the first rich solvent stream, and the at least one slip stream can be heated by heat exchange to produce at least one heated slip stream. At least a portion of the first rich solvent stream can be passed to a bridge heat exchanger to produce a heated rich solvent stream. The at least one heated slip stream with the heated rich solvent stream can be combined to form a combined rich solvent stream. The combined rich solvent stream can be passed to a concentrator to produce a stripped solvent stream as a bottoms stream, and a stripped gas stream as an overhead stream.

In a second aspect, an acid gas removal process is provided that includes providing a feed gas including acid gas to at least one absorber, the at least one absorber including an absorbent material that absorbs acid gas. Acid gas can be removed from the feed gas by absorption to produce a first rich solvent stream including solvent and acid gas. At least one slip stream can be separated from the first rich solvent stream and heating the at least one slip stream by heat exchange to produce at least one heated slip stream. At least a portion of the first rich solvent stream can be passed to a bridge heat exchanger to produce a heated rich solvent stream. The at least one heated slip stream can be combined with the heated rich solvent stream to form a combined rich solvent stream. The combined rich solvent stream can be passed to a concentrator to produce a stripped solvent stream as a bottoms stream, and a stripped gas stream as an overhead stream. The stripped solvent stream can be passed to a regenerator to remove acid gas and produce an acid gas stream as an overhead stream, and a lean solvent stream as a bottoms stream. The stripped gas stream can be passed to a separator to produce a recycle gas stream as an overhead stream. The recycle gas stream can be passed to one or more compressors to produce compressed recycle gas stream.

In a third aspect, an acid gas removal process is provided that includes providing a feed gas including acid gas to at least one absorber, the at least one absorber including an absorbent material that absorbs acid gas. Acid gas can be removed from the feed gas by absorption to produce a first rich solvent stream including solvent and acid gas. A first slip stream can be separated from the first rich solvent stream and heating the first slip stream in a stripper gas heat exchanger by heat exchange with the stripped gas stream to produce a heated first slip stream. At least a portion of the first rich solvent stream can be passed to a bridge heat exchanger to produce a heated rich solvent stream. The first heated slip stream can be combined with the heated rich solvent stream to form a combined rich solvent stream.

BRIEF DESCRIPTION OF THE DRAWINGS

Specific examples have been chosen for purposes of illustration and description, and are shown in the accompanying drawings, forming a part of the specification.

FIG. 1 illustrates a simplified process flow diagram for a Selexol® acid gas removal process.

DETAILED DESCRIPTION

A simplified process flow diagram of an acid gas removal process 100 is illustrated in FIG. 1. Acid gas removal process 100 is a Selexol® process, although it should be understood that process and system efficiencies described herein can be applied to other acid gas removal processes.

In acid gas removal process 100, a feed gas 110 is provided to at least one gas absorber 112 wherein an acid gas is removed from the feed gas 110. The process 100 as shown includes a first gas absorber 112 and a second gas absorber 114, which operate in a two-stage counter-current flow process for acid gas removal. As illustrated, the first stage utilizes first gas absorber 112 to remove hydrogen sulfide from the feed gas 110, and can remove at least some carbon dioxide as well. The second stage utilizes second gas absorber 114 to remove carbon dioxide. First and second absorbers 112 and 114 each contain an absorbent material, or solvent, such as, for example, Selexol®, which absorbs acid gas and thus removes acid gas from the feed gas 110. As the capacity of the solvent to absorb gas is reached, the solvent becomes spent and needs to be regenerated before it can be used again for absorption. Regeneration of the solvent removes acid gas from the solvent.

The solvent utilized in the process 100 can be regenerated thermally, by flashing, or with a stripping gas. The process 100 as illustrated includes all three types of solvent regeneration at various points in the process.

Generally, the process 100 includes a cold acid gas absorption loop 102, a cold solvent flash regeneration loop 104, and a hot solvent stripping regeneration loop 106. In practice, it is desirable and beneficial to maintain the hot solvent stripping loop 106 as hot as process limits allow, while at the same time maintaining the cold loops 102 and 104 as cold as process limits allow. The systems and processes disclosed herein utilize one or more methods of providing overhead waste process heat to increase the feed temperature of the hot solvent stripping regeneration loop 106 in an acid gas removal process.

In some acid gas removal processes, such as the Selexol® process illustrated in FIG. 1, a bridge heat exchanger 108 is typically used to bridge the hot and cold loops via heat exchanging between cold rich solvent and hot lean solvent. The bridge heat exchanger 108 can be a low temperature approach heat exchanger, such as a Packinox heat exchanger, available from Alfa Laval. The temperature approach can be as low as the range of 5° C. to 10° C. at the cold end of the exchanger. However, the temperature approach at the hot end can be as high as 35° C. to 40° C. in a typical design. This high hot end temperature approach is due to excess mass (acid gas loading) in the cold rich solvent as compared to the hot lean solvent. A high temperature approach in the bridge heat exchanger 108 indicates energy inefficiency, which can result in a low feed temperature to the hot solvent regeneration loop 106. Another energy inefficiency can occur as a result of loss of process heat in the concentrator and stripper overhead air-cooled condensers, which accounts for 20-30% of the stripper reboiler duty. Stripper reboiler duty in a large Selexol® unit can easily be as high as 200 MMBTU/hr.

As illustrated in FIG. 1, feed gas 110 can pass through a feed-product heat exchanger 116 prior to entering the first gas absorber 112. Feed-product heat exchanger 116 can be used to heat feed gas 110 and cool product gas 118.

An absorbent medium, such as Selexol®, in the first gas absorber 112 absorbs acid gas, such as, for example, hydrogen sulfide. The feed gas 110 thus undergoes a first absorption process in the first absorber 112, which removes acid gas from the feed gas 110. First gas absorber 112 produces an intermediate product stream 120 as an overhead stream and a first rich solvent stream 122 as a bottoms stream. First rich solvent stream 122 contains spent solvent and acid gas, the spent solvent having absorbed the acid gas during the first absorption process. The various solvent containing streams in acid gas removal process 100 can include various levels of acid gas, such as, for example, having a substantial amount of acid gas and thus being rich, having at least some acid gas removed and thus being semi-lean, and having substantially all of the acid gas removed and being lean. The use of the term "rich" in describing first rich solvent stream 122 thus designates that the solvent stream is rich with acid gas.

Intermediate product stream 120 can be passed to second gas absorber 114. Second gas absorber 114 contains an absorbent medium, such as Selexol®, that absorbs acid gas, such as, for example, carbon dioxide. The intermediate product stream 120 undergoes a second absorption process in the second absorber 114, which removes acid gas from the intermediate product stream 120. Second gas absorber 114 produces a product stream 118 as an overhead stream, and a second rich solvent stream 124 as a bottoms stream. Product stream 118 contains treated gas, and can be passed to heat exchanger 116 to heat feed gas stream 110 before being passed downstream for further processing or for use in a desired application. Second rich solvent stream 124 contains spent solvent and acid gas, the spent solvent having absorbed the acid gas during the second absorption process.

Second rich solvent stream 124 can be divided into at least two streams, including a cold solvent flash regeneration stream 126 and a return stream 128. In at least one example, a portion of the second rich solvent stream 124 can be separated to form return stream 128, and the remainder of the second rich solvent stream 124 can be separated to form cold solvent flash regeneration stream 126. The cold solvent flash regeneration stream 126 can undergo flash regeneration in cold solvent flash regeneration loop 104 to remove at least some of the absorbed acid gas from the solvent and produce semi-lean solvent stream 130, which can then be returned to the second gas absorber 114. The return stream 128 can be passed to the first gas absorber 112. The spent solvent and acid gas in return stream 128 can exit the first gas absorber 112 as part of first rich solvent stream 122.

Rich solvent stream 122 is part of cold acid gas absorption loop 102. At least a portion of rich solvent stream 122 can be passed to bridge heat exchanger 108, to produce heated rich solvent stream 132. Heated rich solvent stream 132 can be the feed stream for the hot solvent stripping regeneration loop 106. As discussed further below, heated rich solvent stream 132 can be the primary feed for the hot solvent stripping regeneration loop 106, with one or more slip streams being combined with the heated rich solvent stream 132 to form a combined rich solvent stream 218 prior to further processing in downstream units to remove acid gas from the solvent. As illustrated in FIG. 1, for example, the solvent rich stream can be combined with one or more slip streams to form a combined solvent rich stream 218 that undergoes a two stage stripping process to remove acid gas from the solvent.

In the first stripping stage, combined rich solvent stream 218 can be passed to a first stripper, such as, for example, concentrator 134. Concentrator 134 can be a stripper that utilizes a stripping gas 160 to remove acid gas, such as, for example, carbon dioxide, from the combined rich solvent stream 218. The stripping gas 160 can, for example, include hydrogen, and can preferably be primarily hydrogen. Concentrator 134 strips acid gas, such as, for example, carbon dioxide, from the combined solvent rich stream 218. Concentrator 134 produces a partially stripped solvent stream 136 as a bottoms stream, and a stripped gas stream 138 as an overhead stream. Stripped gas stream 138 can include carbon dioxide and the stripping gas, and can also include hydrogen sulfide and other components from the feed gas 110.

Partially stripped solvent stream 136 can be passed to a second stripper, such as, for example, regenerator 140 to remove remaining acid gas from the solvent. Regenerator 140 can, for example, utilize thermal stripping to remove hydrogen sulfide from the partially stripped solvent stream 136. Reboiler 158 can be used in conjunction with regenerator 140 in order to facilitate the process of removing acid gas from the solvent in regenerator 140. Regenerator 140 produces an acid gas stream 144 as an overhead stream, and a lean solvent stream 142 as a bottoms stream.

Lean solvent stream 142 can be passed to bridge heat exchanger 108 to provide heat to rich solvent stream 122 and thus produce cooled lean solvent stream 146. Cooled lean solvent stream 146 can be passed to second absorber 114 to replenish the solvent in second absorber 114 and to once again undergo the absorption process.

Stripped gas stream 138, the overhead stream from concentrator 134, can be passed to a separator 148, such as a knock-out drum, which can remove liquid from the stripped gas stream to produce concentrator overhead condensate stream 150 as a bottoms stream and recycle gas stream 152 as an overhead stream. Recycle gas stream 152 can be passed to one or more compressors 154 to produce compressed recycle gas stream 156. Compressed recycle gas stream 156 can be passed to the first absorber 112. Concentrator overhead condensate stream 150 can be combined with partially stripped solvent stream 136 and can be provided to regenerator 140.

Heat integration schemes can be implemented in acid gas removal process 100 in one or more ways. Preferably, overhead waste process heat can be provided to increase the feed temperature of the hot solvent stripping regeneration loop 106. In particular, one or more slip streams can be separated from rich solvent stream 122, which is the bottoms stream from the first absorber 112. The one or more slip streams can be heated by heat exchange to produce one or more heated slip streams, which can then be combined with heated rich solvent stream 132 to form a combined rich solvent stream 218 prior to undergoing further processing in downstream units to remove acid gas from the solvent. The one or more heated slip streams can increase the temperature of heated rich solvent stream 132.

In a first example, a first slip stream 200 can be separated from rich solvent stream 122. First slip stream 200 can preferably be from about 5% by weight to about 20% by weight of the rich solvent stream 122. Most preferably, the solvent mass quantity of the first slip stream 200 can be about equal to the solvent mass quantity of stripped gas stream 138, the overhead stream of the concentrator 134. First slip stream 200 can be passed to a stripper gas heat exchanger 202. First slip stream 200 can be heated in stripper gas heat exchanger 202 by heat exchange with the stripped gas stream 138, to produce heated first slip stream 204. Heated first slip stream 204 can be combined with heated rich solvent stream 132 to form combined rich solvent stream 218, and combined rich solvent stream 218 can be provided to concentrator 134. The use of first slip stream 200 can increase the temperature of heated rich solvent stream 132. Preferably, heated first slip stream 204 can increase the temperature of heated rich solvent stream 132 by about 10° C. to about 15°, or greater. The temperature increase in heated first slip stream 204 can enhance the performance of concentrator 134. The temperature increase in heated first slip stream 204 can also result in an increased the temperature of partially stripped solvent stream 136, and can reduce the required duty of reboiler 158.

In a second example, a second slip stream 206 can be separated from rich solvent stream 122. Second slip stream 206 can preferably be from about 5% by weight to about 20% by weight of the rich solvent stream 122. Most preferably, the solvent mass quantity of the second slip stream 206 can be about equal to the solvent mass quantity of acid gas stream 144, the overhead stream of the regenerator 140. Second slip stream 206 can be passed to a regenerator heat exchanger 208. Second slip stream 206 can be heated in regenerator exchanger 208 by heat exchange with the acid gas stream 144, to produce heated second slip stream 210. Heated second slip stream 210 can be combined with heated rich solvent stream 132 to form combined rich solvent stream 218, and combined rich solvent stream 218 can be provided to concentrator 134.

In a third example, a third slip stream 212 can be separated from rich solvent stream 122. Third slip stream 212 can preferably be from about 5% by weight to about 20% by weight of the rich solvent stream 122. Most preferably, the solvent mass quantity of the third slip stream 212 can be about equal to the solvent mass quantity of compressed recycle gas stream 156, the overhead stream of separator 148 after undergoing compression in the one or more compressors 154. Third slip stream 212 can be passed to a recycle gas heat exchanger 214. Third slip stream 212 can be heated in recycle gas exchanger 214 by heat exchange with the compressed recycle gas stream 156, to produce heated third slip stream 216. Heated third slip stream 216 can be combined with heated rich solvent stream 132 to form combined rich solvent stream 218, and combined rich solvent stream 218 can be provided to concentrator 134.

Depending upon the type of acid gas removal process being utilized in any given application, the slip streams described above can be implemented together or separately. Accordingly, systems and processes for acid gas removal can include at least one of first slip stream 200, second slip stream 206 and third slip stream 212. For example, the second slip stream 206 can be applied to acid gas removal processes utilizing amine units. With respect to Selexol® processes, slip stream 1 has been found to provide a higher value of heat recovery as compared to second and third slip streams 206 and 212. Accordingly, such acid gas removal processes preferably include at least first slip stream 200, and can further include at least one of second slip stream 206 and slip stream 212, or both. Utilization of all three slip streams can result an increase of temperature in heated rich solvent stream 132 of up to about 25° C. Utilization of all three slip streams can also preferably result in more efficient operation of the concentrator 134, and can require from about 15% to about 20% less stripping gas. The duty requirements for reboiler 158 can also preferably be reduced by from about 15% to about 30%.

The heat integration schemes described above can be affected by the acid gas loading in rich solvent stream 122, and can provide greater benefits based upon the availability of excess rich solvent over lean solvent. In some examples, it has been found that high pressure Selexol® units can provide a greater percentage of energy savings as compared to low pressure Selexol® units.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. An acid gas removal process comprising the steps of:
providing a feed gas including acid gas to at least one absorber, the at least one absorber including an absorbent material that absorbs acid gas;
removing acid gas from the feed gas by absorption to produce a first rich solvent stream including solvent and acid gas;
separating at least one slip stream from the first rich solvent stream and heating the at least one slip stream by heat exchange to produce at least one heated slip stream;
passing at least a portion of the first rich solvent stream to a bridge heat exchanger to produce a heated rich solvent stream;
combining the at least one heated slip stream with the heated rich solvent stream to form a combined rich solvent stream before any stripping; and
passing the combined rich solvent stream to a concentrator to produce a stripped solvent stream as a bottoms stream, and a stripped gas stream as an overhead stream.

2. The acid gas removal process of claim 1, wherein the at least one slip stream comprises a first slip stream that is heated in a stripper gas heat exchanger by heat exchange with the stripped gas stream to produce a heated first slip stream.

3. The acid gas removal process of claim 2, wherein the first slip stream is from about 5% by weight to about 20% by weight of the rich solvent stream.

4. The acid gas removal process of claim 2, wherein the first slip stream has a solvent mass quantity that is substantially equal to a solvent mass quantity of the stripped gas stream.

5. The acid gas removal process of claim 2, wherein a second slip stream has a solvent mass quantity that is substantially equal to a solvent mass quantity of the acid gas stream.

6. The acid gas removal process of claim 1, further comprising:
passing the stripped solvent stream to a regenerator to remove acid gas and produce an acid gas stream as an overhead stream, and a lean solvent stream as a bottoms stream.

7. The acid gas removal process of claim 6, wherein the at least one slip stream comprises a slip stream that is heated in a regenerator exchanger by heat exchange with the acid gas stream to produce a heated slip stream.

8. The acid gas removal process of claim 7, wherein the slip stream is from about 5% by weight to about 20% by weight of the rich solvent stream.

9. The acid gas removal process of claim 1, further comprising:
passing the stripped gas stream to a separator to produce a recycle gas stream as an overhead stream; and
passing the recycle gas stream to one or more compressors to produce compressed recycle gas stream.

10. The acid gas removal process of claim 9, wherein the at least one slip stream comprises a slip stream that is heated in a recycle gas exchanger by heat exchange with the compressed recycle gas stream to produce a heated slip stream.

11. The acid gas removal process of claim 10, wherein the slip stream is from about 5% by weight to about 20% by weight of the rich solvent stream.

12. The acid gas removal process of claim 10, wherein the slip stream has a solvent mass quantity that is substantially equal to a solvent mass quantity of the compressed recycle gas stream.

13. An acid gas removal process comprising the steps of:
providing a feed gas including acid gas to at least one absorber, the at least one absorber including an absorbent material that absorbs acid gas;
removing acid gas from the feed gas by absorption to produce a first rich solvent stream including solvent and acid gas;
separating at least one slip stream from the first rich solvent stream and heating the at least one slip stream by heat exchange to produce at least one heated slip stream;
passing at least a portion of the first rich solvent stream to a bridge heat exchanger to produce a heated rich solvent stream;
combining the at least one heated slip stream with the heated rich solvent stream to form a combined rich solvent stream before any stripping;
passing the combined rich solvent stream to a concentrator to produce a stripped solvent stream as a bottoms stream, and a stripped gas stream as an overhead stream;
passing the stripped solvent stream to a regenerator to remove acid gas and produce an acid gas stream as an overhead stream, and a lean solvent stream as a bottoms stream;
passing the stripped gas stream to a separator to produce a recycle gas stream as an overhead stream; and
passing the recycle gas stream to one or more compressors to produce compressed recycle gas stream.

14. The acid gas removal process of claim 13, wherein the at least one slip stream comprises a first slip stream that is heated in a stripper gas heat exchanger by heat exchange with the stripped gas stream to produce a heated first slip stream.

15. The acid gas removal process of claim 13, wherein the at least one slip stream comprises a slip stream that is heated in a regenerator exchanger by heat exchange with the acid gas stream to produce a heated slip stream.

16. The acid gas removal process of claim 13, wherein the at least one slip stream comprises a slip stream that is heated in a recycle gas exchanger by heat exchange with the compressed recycle gas stream to produce a heated slip stream.

17. The acid gas removal process of claim 13, wherein the at least one slip stream comprises:
a first slip stream that is heated in a stripper gas heat exchanger by heat exchange with the stripped gas stream to produce a heated first slip stream; and
at least one of a slip stream that is heated in a regenerator exchanger by heat exchange with the acid gas stream to produce another heated slip stream, or a slip stream that is heated in a recycle gas exchanger by heat exchange with the compressed recycle gas stream to produce a further heated slip stream.

18. An acid gas removal process comprising the steps of:
providing a feed gas including acid gas to at least one absorber, the at least one absorber including an absorbent material that absorbs acid gas;
removing acid gas from the feed gas by absorption to produce a first rich solvent stream including solvent and acid gas;
separating a first slip stream from the first rich solvent stream and heating the first slip stream in a stripper gas heat exchanger by heat exchange with the stripped gas stream to produce a heated first slip stream;
passing at least a portion of the first rich solvent stream to a bridge heat exchanger to produce a heated rich solvent stream; and
combining the first heated slip stream with the heated rich solvent stream to form a combined rich solvent stream before any stripping.

19. The process of claim 18, further comprising:
passing the combined rich solvent stream to a concentrator to produce a stripped solvent stream as a bottoms stream, and a stripped gas stream as an overhead stream;
passing the stripped solvent stream to a regenerator to remove acid gas and produce an acid gas stream as an overhead stream, and a lean solvent stream as a bottoms stream; and
separating a second slip stream from the first rich solvent stream that is heated in a regenerator exchanger by heat exchange with the acid gas stream to produce a heated second slip stream.

20. The process of claim 18, further comprising:
passing the combined rich solvent stream to a concentrator to produce a stripped solvent stream as a bottoms stream, and a stripped gas stream as an overhead stream;
passing the stripped solvent stream to a regenerator to remove acid gas and produce an acid gas stream as an overhead stream, and a lean solvent stream as a bottoms stream;
passing the stripped gas stream to a separator to produce a recycle gas stream as an overhead stream;
passing the recycle gas stream to one or more compressors to produce compressed recycle gas stream; and
separating a slip stream from the first rich solvent stream that is heated in a recycle gas exchanger by heat exchange with the compressed recycle gas stream to produce a further heated slip stream.

* * * * *